United States Patent [19]

Yoshimoto

[11] Patent Number: 5,565,962
[45] Date of Patent: Oct. 15, 1996

[54] METHOD OF AND APPARATUS FOR PREVENTING FORGERY OF SPECIFIC IMAGE

[75] Inventor: Takeshi Yoshimoto, Kamikyo-ku, Japan

[73] Assignee: Dainippon Screen Mfg. Co., Ltd., Japan

[21] Appl. No.: 368,110

[22] Filed: Jan. 3, 1995

[30] Foreign Application Priority Data

Jan. 25, 1994 [JP] Japan .................................. 6-023827

[51] Int. Cl.$^6$ .................................................. G03G 21/00
[52] U.S. Cl. ........................... 355/201; 356/71; 382/135; 382/165
[58] Field of Search .................................... 355/201, 206; 382/135, 165, 181; 356/71, 402; 283/114, 902

[56] References Cited

U.S. PATENT DOCUMENTS

| | | | |
|---|---|---|---|
| 5,216,724 | 6/1993 | Suzuki et al. | 355/201 X |
| 5,321,470 | 6/1994 | Hasuo et al. | 355/201 |
| 5,363,202 | 11/1994 | Udagawa et al. | 355/201 X |
| 5,379,093 | 1/1995 | Hashimoto et al. | 355/201 |

FOREIGN PATENT DOCUMENTS

| | | |
|---|---|---|
| 0488796 | 11/1991 | European Pat. Off. . |
| 0506469 | 3/1992 | European Pat. Off. . |
| 56-149685 | 11/1981 | Japan . |
| 60-229572 | 11/1985 | Japan . |
| 4-227367 | 8/1992 | Japan . |

Primary Examiner—William J. Royer
Attorney, Agent, or Firm—Ostrolenk, Faber, Gerb & Soffen, LLP

[57] ABSTRACT

The system of the present invention records a plurality of color separation images corresponding to an original color image simultaneously with determining whether the original color image conforms with any predetermined specific image, thereby assuredly preventing forgery of specific images such as bank notes. A color scanner (1) includes a scanner unit (10) and a bank-note identification unit (50). An invalidating lamp (71) is disposed in the vicinity of a record head (33) of the scanner unit (10). The invalidating lamp (71) can expose the whole surface of a recording film RF wound upon an output drum (17) to an exposure light. The bank-note identification unit (50) receives digital image signals Sy, Sk, Sm, and Sc input into a scanning head (19), determines whether an original OF is a bank note, and turns on the invalidating lamp (71) based on the recognition of the original OF as a bank note. This process effectively blackens the whole recording surface of the recording film RF to invalidate the record on the recording film RF.

12 Claims, 9 Drawing Sheets

METHOD OF AND APPARATUS FOR PREVENTING FORGERY OF SPECIFIC IMAGE

BACKGROUND OF THE INVENTION

1. Field of the Invention

The present invention relates to an image recording method and apparatus for preventing forgery of specific original images including bank notes.

2. Description of the Related Art

With recent development of technology in the field of color photocopy machines and color scanners, there is some fear of forgery of bank notes and bills using this technology. Accordingly, color photocopy machines that prevent forgery have been proposed. The color photocopy machine with the forgery-preventing function reads an image of an original by irradiating the original with an illuminating light, compares the original image with previously stored specific images representing bank notes to determine whether the original is a bank note, and interferes with photocopying of the original image on an affirmative determination.

Figure 1:
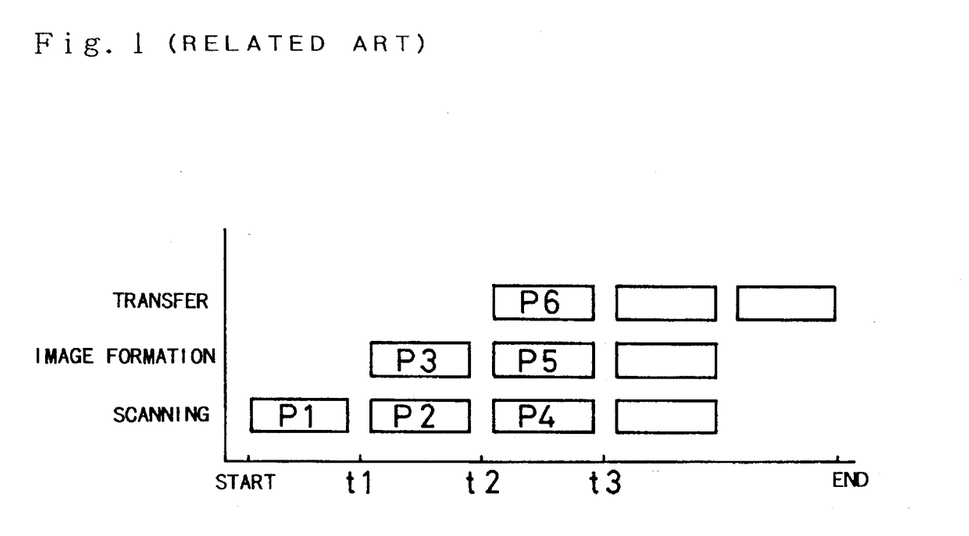
FIG. 1 shows the timing of each step in an image recording process with a standard color photocopy machine.

FIG. 1 shows the timing of each step in an image recording process with a standard color photocopy machine. After a pre-scanning step P1 (from the start through a first time point t1) for obtaining information regarding an original, a first scanning step P2 is executed simultaneously with a first latent image forming step P3 (the first time point t1 through a second time point t2). A blue (B) light component of the original is obtained at the first scanning step P2, and a latent image is formed on a photosensitive drum with a light beam of the B component at the first latent image forming step P3. In the time period between the second time point t2 and a third time point t3, a second scanning step P4 for obtaining a green (G) light component of the original is executed simultaneously with a second latent image forming step P5 for forming a latent image on the photosensitive drum with a light beam of the G component and a first transfer step P6 for transferring the latent image formed with the light beam of the B component onto a sheet of paper. The respective components of the light beam are successively transferred onto the sheet of paper with a certain delay from the scanning step and the latent image forming step for the corresponding components.

The color photocopy machine having the forgery-preventing function determines whether the original is a bank note at the pre-scanning step P1 and interferes with the subsequent steps based on an affirmative determination.

The identification of the original may be performed at any scanning step P2 or P4 instead of the pre-scanning step P1. In any case, immediately after recognizing the original as a bank note, the color photocopy machine totally interferes with the subsequent steps for preventing duplication of the original. This means that even part of a bank note like one half or one third is not duplicated at all.

Figure 2:
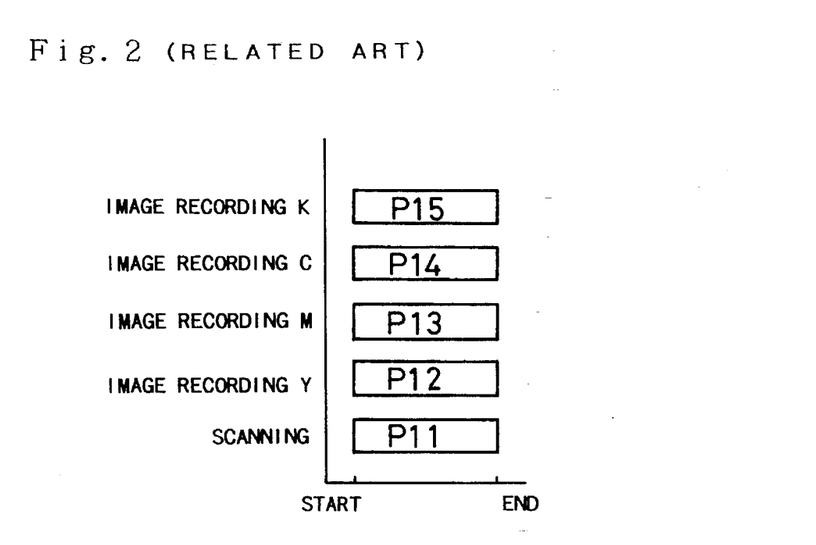
FIG. 2 shows the timing of each step in an image recording process with a standard color scanner.

This preventing process is, however, available only in color photocopy machines and is not applicable to color scanners because of the following reasons. In a color scanner, as shown in FIG. 2, a scanning process P11 for reading an image of an original is executed simultaneously with image recording steps P12, P13, P14, and P15 for recording color separation images of Y (yellow), M (magenta), C (cyan), and, K (black) separations. When the original is recognized as a bank note in the middle of the scanning step P11, the respective image recording steps P12, P13, P14, and P15 have already been implemented to some extent. Part of a bank note, like one half or one third, has thus been reproduced in a complete form on a recording film. Repetition of such process gives a plurality of partial images of the bank note. A complete bank note can be reproduced by patching the plurality of partial images. Although some color scanners recently proposed have a pre-scanning function for smooth set-up, the pre-scanning process is not essential in color scanners.

SUMMARY OF THE INVENTION

The object of the present invention is thus to record a plurality of color separation images corresponding to an original color image simultaneously with determining whether the original color image conforms with any predetermined specific image, thereby assuredly preventing forgery of specific images such as bank notes.

The above and the other related objects are realized by an image recording apparatus for recording a color image. The apparatus comprises: input means for successively receiving a plurality of image signals representing a plurality of color separation images corresponding to an original color image; image recording means for recording the plurality of color separation images onto a recording medium based on the plurality of image signals received by the input means; determination means for comparing the plurality of image signals received by the input means with specific image data representing a predetermined specific image and determining whether the original color image conforms with the specific image; and record invalidating means for invalidating a record on the recording medium formed by the image recording means when the determination means determines that the original color image conforms with the specific image.

In one preferable structure, the determination means further comprises: conformity degree calculation means for calculating a degree of conformity of the original color image with the specific image based on a comparison of the image signals with the specific image data; and conformity determination means for determining whether the original color image conforms with the specific image according to a comparison of the degree of conformity with a predetermined first threshold value.

The image recording apparatus may also include: abnormal operation detecting means for detecting an abnormal operation of intentionally stopping the image recording means during recording; and forcible invalidating means for activating the record invalidating means when the abnormal operation is detected.

In this structure, the determination means may further include forcible-invalidating process cancellation means for interfering with execution of the forcible invalidating means when the degree of conformity is not greater than a predetermined second threshold value.

According to another aspect of the invention, the image recording apparatus further includes interference detecting means for detecting an attempt to interfere with execution of the record invalidating means; and driving prohibition means for prohibiting actuation of the image recording means when the attempt to interfere is detected.

In one preferable structure, the interference detecting means comprises voltage drop detecting means for detecting a decrease in a voltage supplied to the image recording apparatus.

In another preferable structure, the record invalidating means comprises an invalidating lamp which exposes a whole surface of the recording medium to a light beam in the course of the recording. In this case, the interference detecting means comprises lamp disconnection detecting means for detecting disconnection of the invalidating lamp from the record invalidating means. Alternatively, the record invalidating means may comprise recording medium damaging means for damaging the recording medium.

The present invention is also directed to an image recording apparatus which further includes alarm means for generating an alarm when an attempt to interfere with execution of the record invalidating means is detected.

The invention is also directed to a method of recording a color image with an image recording apparatus. The method includes the steps of:

(a) successively receiving a plurality of image signals representing a plurality of color separation images corresponding to an original color image;

(b) recording the plurality of color separation images onto a recording medium based on the plurality of image signals received in step (a);

(c) comparing the plurality of image signals received in step (a) with specific image data representing a predetermined specific image and determining whether the original color image conforms with the specific image; and (d) when the original color image is determined to conform with the specific image in step (c), invalidating a record on the recording medium by step (b).

BRIEF DESCRIPTION OF THE DRAWINGS

These and other objects, features, aspects, and advantages of the present invention will become more apparent from the following detailed description of the preferred embodiments with the accompanying drawings.

DETAILED DESCRIPTION OF EMBODIMENTS OF THE INVENTION

Figure 3:
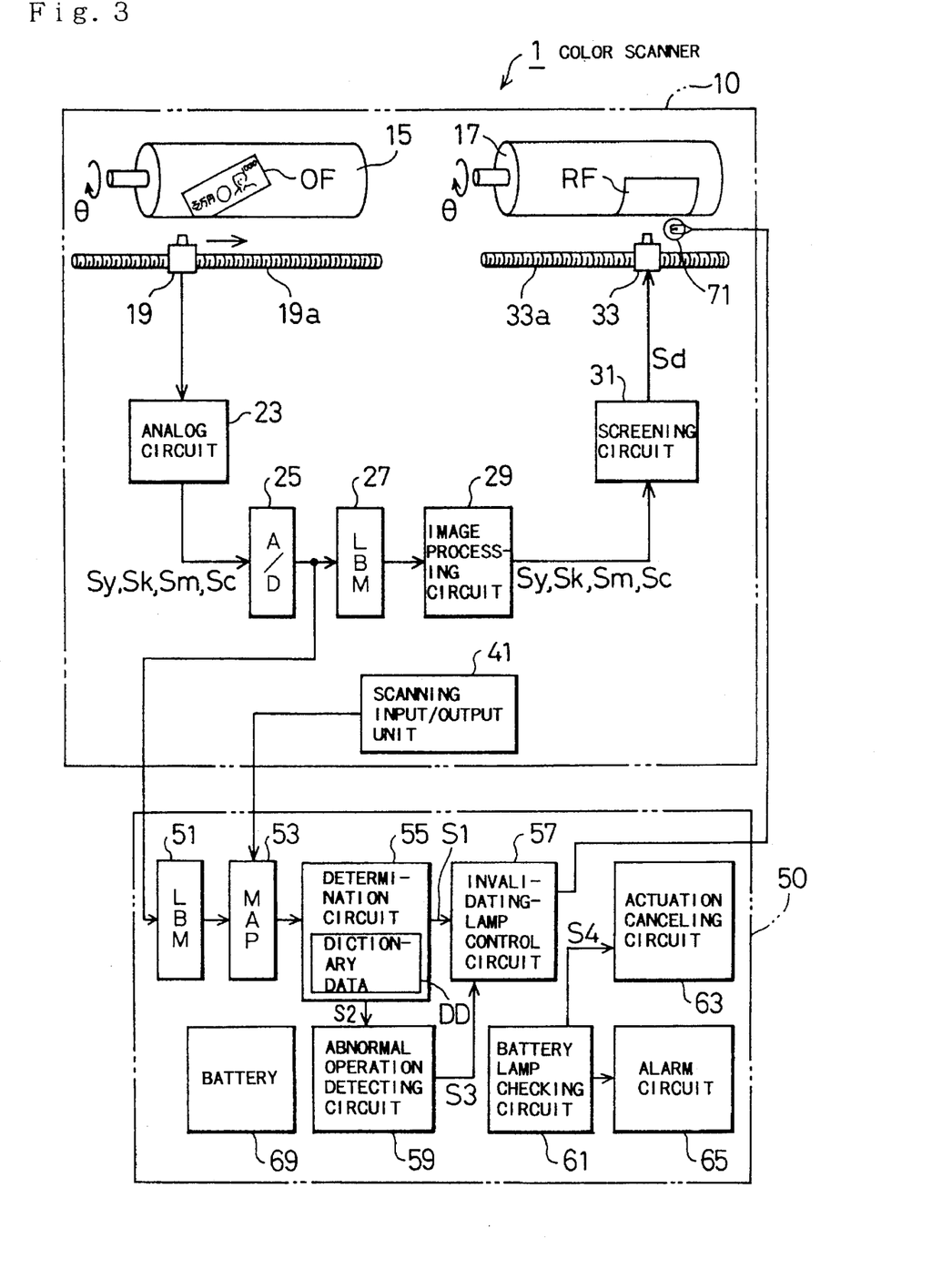
FIG. 3 is a block diagram schematically illustrating a color scanner 1 as a first embodiment of the invention.

FIG. 3 is a block diagram schematically illustrating a color scanner 1 as a first embodiment of the invention. As shown in FIG. 3, the color scanner 1 includes a scanner unit 10 and a bank-note identification unit 50. The scanner unit 10 includes a transparent input drum 15 and an output drum 17. An original OF is wound upon the input drum 15 while a recording film RF for recording halftone dot images is wound upon the output drum 17.

In a process of scanning the original OF to read original image data, while the input drum 15 rotates in a direction θ at a fixed speed, a scanning head 19 is shifted by a feeding screw 19a in a direction parallel to a shaft of the input drum 15 at a given speed. A light source (not shown) disposed inside the input drum 15 emits a light beam, which passes through the input drum 15 and the original OF and is received by the scanning head 19. Three primary components, blue (B), green (G), and red (R) of the light beam focused on the scanning head 19 are converted respectively to electrical signals and sent to an analog circuit 23. The analog circuit 23 executes required processes including color correction and tone transformation to convert the electrical signals to image signals Sy, Sk, Sm, and Sc representing color separation images of Y (yellow), K (black), M (magenta), and C (cyan) separations, respectively.

An A/D converter 25 further converts the image signals Sy, Sk, Sm, and Sc to digital signals, which are sent to an image processing circuit 29 via a line buffer memory (LBM) 27. The image processing circuit 29 executes required image processing for the image signals Sy, Sk, Sm, and Sc and subsequently transmits the processed signals Sy, Sk, Sm, and Sc to a screening circuit 31, which generates halftone dot signals Sd corresponding to the image signals Sy, Sk, Sm, and Sc.

The halftone dot signals Sd are then sent to a record head 33, which starts and stops emission of a laser beam from a laser generator (not shown) in response to the halftone dot signals Sd so as to expose the recording film RF wound upon the output drum 17 to the laser beam. This allows halftone dot images of the Y, K, M, and C separations to be recorded on the recording film RF. In the process of recording, while the output drum 17 rotates in the direction θ at a fixed speed, the record head 33 is shifted by a feeding screw 33a in a direction parallel to a shaft of the output drum 17 at a given speed.

The image signals Sy, Sk, Sm, and Sc converted to the digital signals by the A/D converter 25 are also transmitted to the bank-note identification unit 50, which determines whether the image of the original OF is a bank note based on the digitized image signals Sy, Sk, Sm, and Sc, and turns on an invalidating lamp 71 based on results of the determination. The invalidating lamp 71 disposed in the vicinity of the record head 33 can expose the whole surface of the recording film RF wound upon the output drum 17 to an exposure light emitted therefrom. The bank-note identification unit 50 is provided with a line buffer memory (LBM) 51, a mapping circuit (MAP) 53, a determination circuit 55, a invalidating-lamp control circuit 57, an abnormal operation detecting circuit 59, a battery lamp checking circuit 61, an actuation canceling circuit 63, and an alarm circuit 65 as well as a battery 69 for supplying power to all of these elements.

The digital image signals Sy, Sk, Sm, and Sc transmitted from the A/D converter 25 of the scanner unit 10 are first stored in the line buffer memory 51 and then sent to the mapping circuit 53. The mapping circuit 53 reads data representing a recording magnification f of the original OF input from a scanning input/output unit (for example, keyboard) 41 of the scanner unit 10, and multiplies the digital image signals Sy, Sk, Sm, and Sc, which have been expanded or compressed previously by the recording magnification f in the analog circuit 23, by the reciprocal 1/f of the recording magnification f so as to generate full-scale image data representing the original OF in full scale.

The full-scale image data generated by the mapping circuit 53 are transmitted to the determination circuit 55. The determination circuit 55 compares the full-scale image data of the original OF with dictionary data DD representing specific images previously stored (in this embodiment, images of various bank notes or bills) to identify the full-scale image data. The determination circuit 55 outputs an identification signal S1, which shows whether the original OF is identical with one of the pre-stored specific images, to the invalidating-lamp control circuit 57. The determination circuit 55 also outputs a recognition rate signal S2 representing a probability of true identification to the abnormal operation detecting circuit 59.

The abnormal operation detecting circuit 59 detects an abnormal operation such as an intentional stop of scanning or power cut-off when the bank-note recognition rate (probability of true identification) corresponding to the recognition rate signal S2 becomes greater than a predetermined threshold value. The abnormal operation detecting circuit 59 generates an abnormal operation signal S3 in response to detection of any abnormal operation. The abnormal operation signal S3 is transmitted to the invalidating-lamp control circuit 57, which switches on and off the invalidating lamp 71 based on the abnormal operation signal S3 from the abnormal operation detecting circuit 59 and the recognition rate signal S2 transmitted from the detection circuit 55.

The battery lamp checking circuit 61 checks the amount of electricity storage in the battery 69, and generates a weak battery signal S4 when the amount of electricity storage decreases to a predetermined level. The weak battery signal S4 is transmitted to the actuation canceling circuit 63 and the alarm circuit 65. The actuation canceling circuit 63 interferes with operation of the driving circuit of the scanner unit 10 in response to the weak battery signal S4. The alarm circuit 65 sounds or flashes an alarm in response to the weak battery signal S4.

Details of the circuit structure including the determination circuit 55, the invalidating-lamp control circuit 57, the abnormal operation detecting circuit 59, the battery lamp checking circuit 61, and the actuation canceling circuit 63 are described while referring to the drawings.

Figure 4:
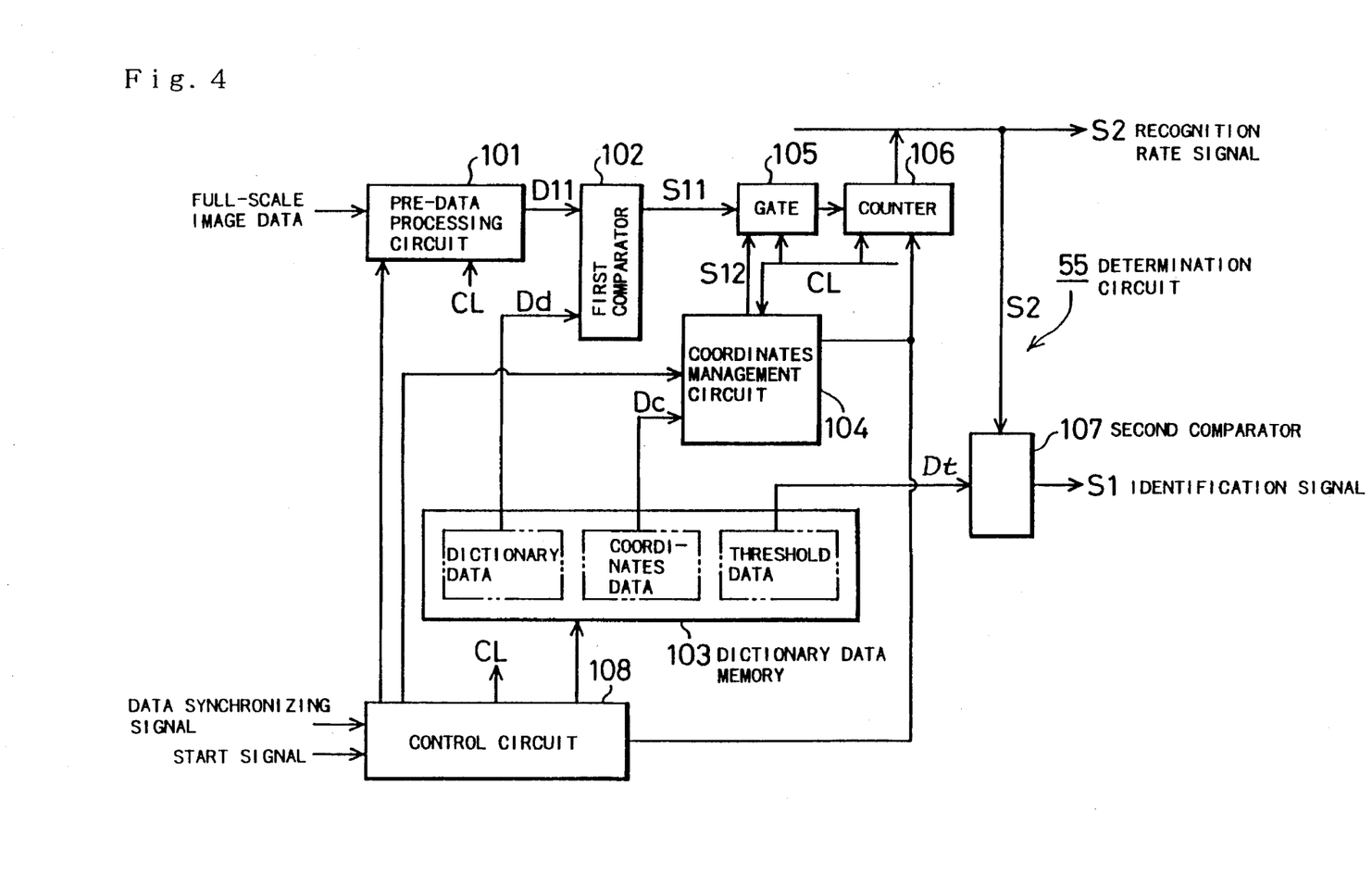
FIG. 4 is a block diagram schematically illustrating a determination circuit 55 forming part of the color scanner of FIG. 1.

FIG. 4 is a block diagram schematically illustrating the determination circuit 55. The determination circuit 55 includes a pre-data processing circuit 101, a first comparator 102, a dictionary data memory 103, a coordinates management circuit 104, a gate 105, a counter 106, a second comparator 107, and a control circuit 108.

Figure 5:
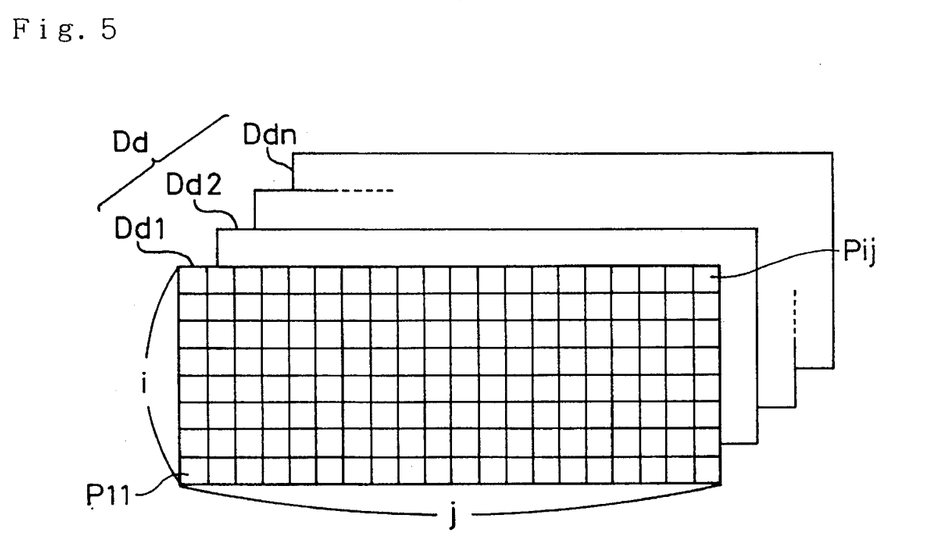
FIG. 5 illustrates contents of dictionary data Dd forming part of the color scanner of FIG. 1.

Dictionary data Dd representing characteristics of bank notes, coordinates data Dc, and threshold data Dt are previously stored in the dictionary data memory 103. The dictionary data Dd consists of a number 'n' (n=an integer) of reference data Dd1, Dd2, ..., Ddn, respectively representing the number 'n' of bank notes as illustrated in FIG. 5. The reference data Dd1 through Ddn may be generated in the following manner. Specific image data representing a bank note are divided into 'i' unit areas in a vertical direction and 'j' unit areas in a horizontal direction (i, j=integers). Each unit area, for example, corresponds to a square of a predetermined dimension. A reference value P of each unit area is determined by processing all digital image signals in the unit area according to Gaussian distribution. Each of the reference data Dd1 through Ddn consists of 'i'×'j' reference values P11 through Pij.

The coordinates data Dc correspond to coordinate values representing positions of the respective reference values P11 through Pij. The threshold data Dt represents a threshold value used in the second comparator 107 for comparison.

The full-scale image data transmitted from the mapping circuit 53 to the determination circuit 55 are first sent to the pre-data processing circuit 101 for preprocessing. The preprocessing for the full-scale image data is similar to the processing executed for the specific image data to generate the reference data Dd1 through Ddn. The full-scale image data are divided into 'x'×'y' unit areas (having the same dimensions as those of the unit area in generation of the reference data). A characteristic value Q of each unit area is then determined by processing all digital images signals in the unit area according to Gaussian distribution. Target data D11 consists of 'x'×'y' characteristic values Q11 through Qxy. The target data D11 is transmitted to the first comparator 102, which compares the target data D11 with the respective reference data Dd1 through Ddn of the dictionary data Dd transmitted from the dictionary data memory 103.

In operation, the first comparator 102 compares each unit area of the target data D11 with the corresponding unit area of the dictionary data Dd, and outputs a conformity signal S11 to the gate 105 when the target data D11 conforms with the dictionary data Dd. When conformity of the target data D11 with the dictionary data Dd is determined first at a certain point, the coordinates management circuit 104 stores coordinates of the first conformity point of the target data D11 and coordinates of the corresponding point of the dictionary data Dd. While the first comparator 102 executes the subsequent comparison, the coordinates management circuit 104 determines whether currently processed points of the target data D11 and the dictionary data Dd are located at identical positions relative to the respective first conformity points. When the determination result is affirmative, the coordinates management circuit 104 outputs a coordinates conformity signal S12, which shows that relative coordinates of both the currently processed points conform with each other, to the gate 105.

The gate 105 determines whether the conformity signal S11 output from the first comparator 102 is to be transmitted to the subsequent counter 106, based on the output or non-output of the coordinates conformity signal S12 from the coordinates management circuit 104. When the first comparator 102 determines that a certain point of the target data D11 conforms with a point of the dictionary data Dd and when the coordinates management circuit 104 determines that the relative coordinates of the two points conform with each other, the gate 105 allows the conformity signal S11 to be transmitted to the subsequent stage. To the contrary, when a certain point of the target data D11 conforms with a point of the dictionary data Dd, but the relative coordinates of the two points do not conform with each other, the gate 105 prohibits transmission of the conformity signal S11.

The counter 106 counts the number of conformity signals transmitted from the gate 105 as a bank-note recognition rate and outputs the recognition rate signal S2 representing the bank-note recognition rate outside the determination circuit 55. The recognition rate signal S2 is also transmitted to the second comparator 107, which compares the value of the recognition rate signals S2 sent from the counter 106 with the value of the threshold data Dt sent from the dictionary data memory 130 and outputs the identification signal S1 outside the determination circuit 55 when the former becomes greater than the latter.

Figure 6:
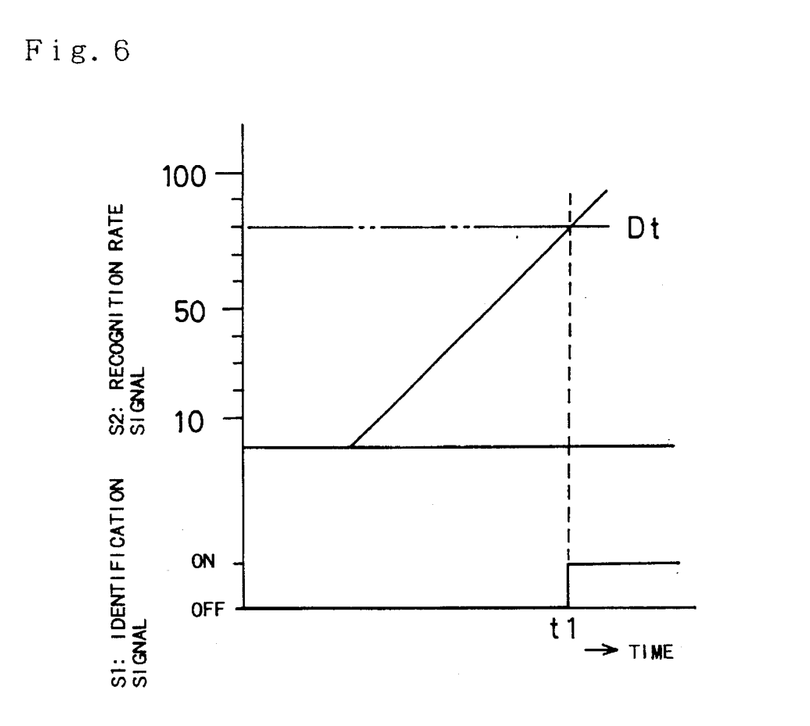
FIG. 6 is a timing chart showing operation of a second comparator 107 forming part of the color scanner of FIG. 1.

The threshold data Dt represents a threshold value, which shows how many unit areas out of the 'i'×'j' unit areas constituting each of the reference data Dd1 through Ddn should conform with those of full-scale image data in order to determine that the original OF corresponding to the full-scale image data is a bank note. As shown in the timing chart of FIG. 6, when the value of the recognition rate signal S2 gradually increases to be greater than the value of the threshold data Dt (for example, 80% of all the unit areas) at a time point t1, the second comparator 107 determines that the original OF corresponding to the full-scale image data is a bank note and switches on the identification signal S1.

Figure 7:
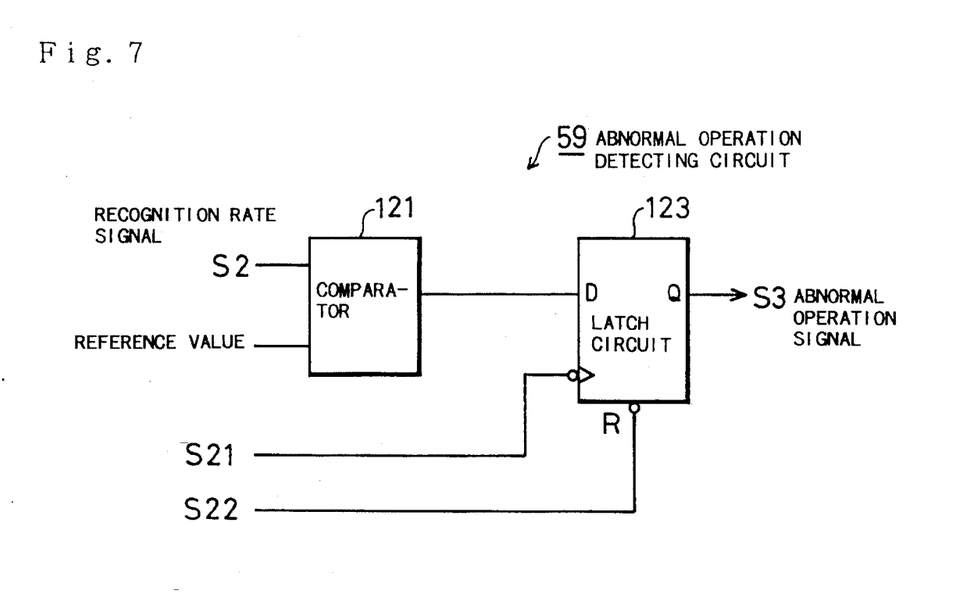
FIG. 7 is a block diagram illustrating an abnormal operation detecting circuit 59 forming part of the color scanner of FIG. 1.

FIG. 7 is a block diagram illustrating a typical structure of the abnormal operation detecting circuit 59. As shown in FIG. 7, the abnormal operation detection circuit 59 includes a comparator 121 and a latch circuit 123. The recognition rate signal S2 output from the determination circuit 55 to the abnormal operation detecting circuit 59 is first received by the comparator 121, which compares the recognition rate corresponding to the recognition rate signal S2 with a predetermined reference value input into the comparator 121. The predetermined reference value represents a threshold of the bank-note recognition rate to start detection of abnormal operation.

When the recognition rate corresponding to the recognition rate signal S2 is determined to be greater than the predetermined reference value, the comparator 121 switches ON a D terminal of the latch circuit 123. A clock terminal of the latch circuit 123 receives a scanning signal S21 which is in ON conditions during execution of scanning with the scanning head 19 whereas an R terminal receives a power-on signal S22 representing ON conditions of the color scanner 1.

Figure 8:
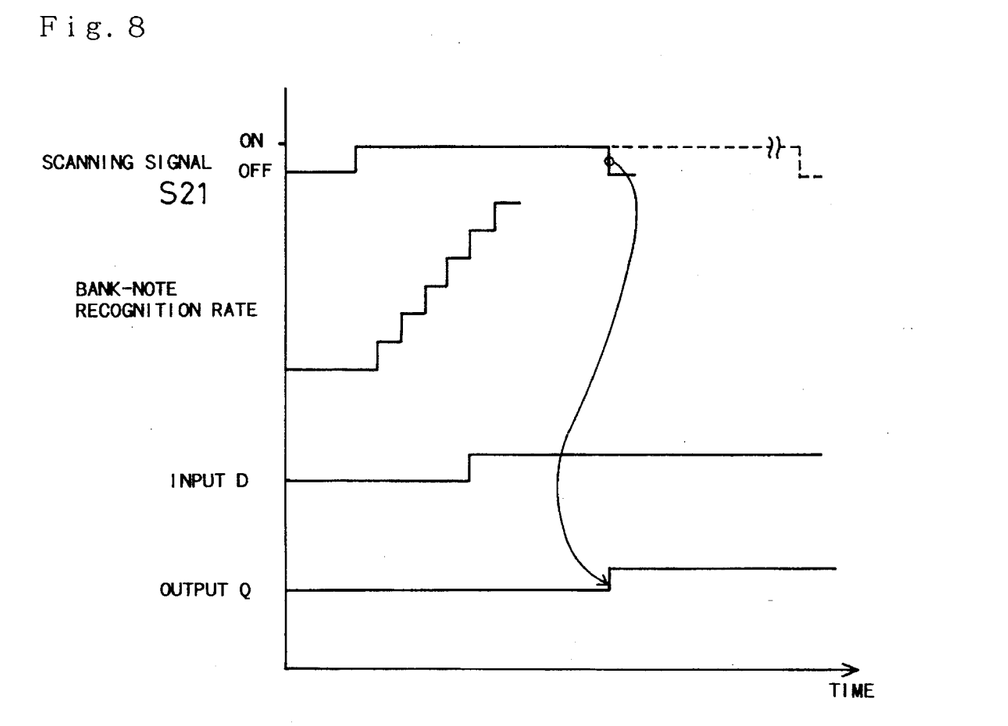
FIG. 8 is a timing chart showing operation of the abnormal operation detecting circuit 59.

As shown in the timing chart of FIG. 8, when the scanning signal S21 falls to an OFF condition while the D terminal is in an ON condition, the latch circuit 123 outputs an ON signal from an output terminal Q thereof at the timing of the fall. When the power-on signal S22 falls to an OFF condition, the latch circuit 123 is reset to output an OFF signal from the output terminal Q thereof, so that the abnormal operation signal S3 reaches a stationary state.

When an abnormal operation such as an intentional stop of scanning is executed while the bank-note recognition rate corresponding to the recognition rate signal S2 is greater than the predetermined reference value, the abnormal operation detecting circuit 59 thus constructed outputs the abnormal operation signal S3.

Figure 9:
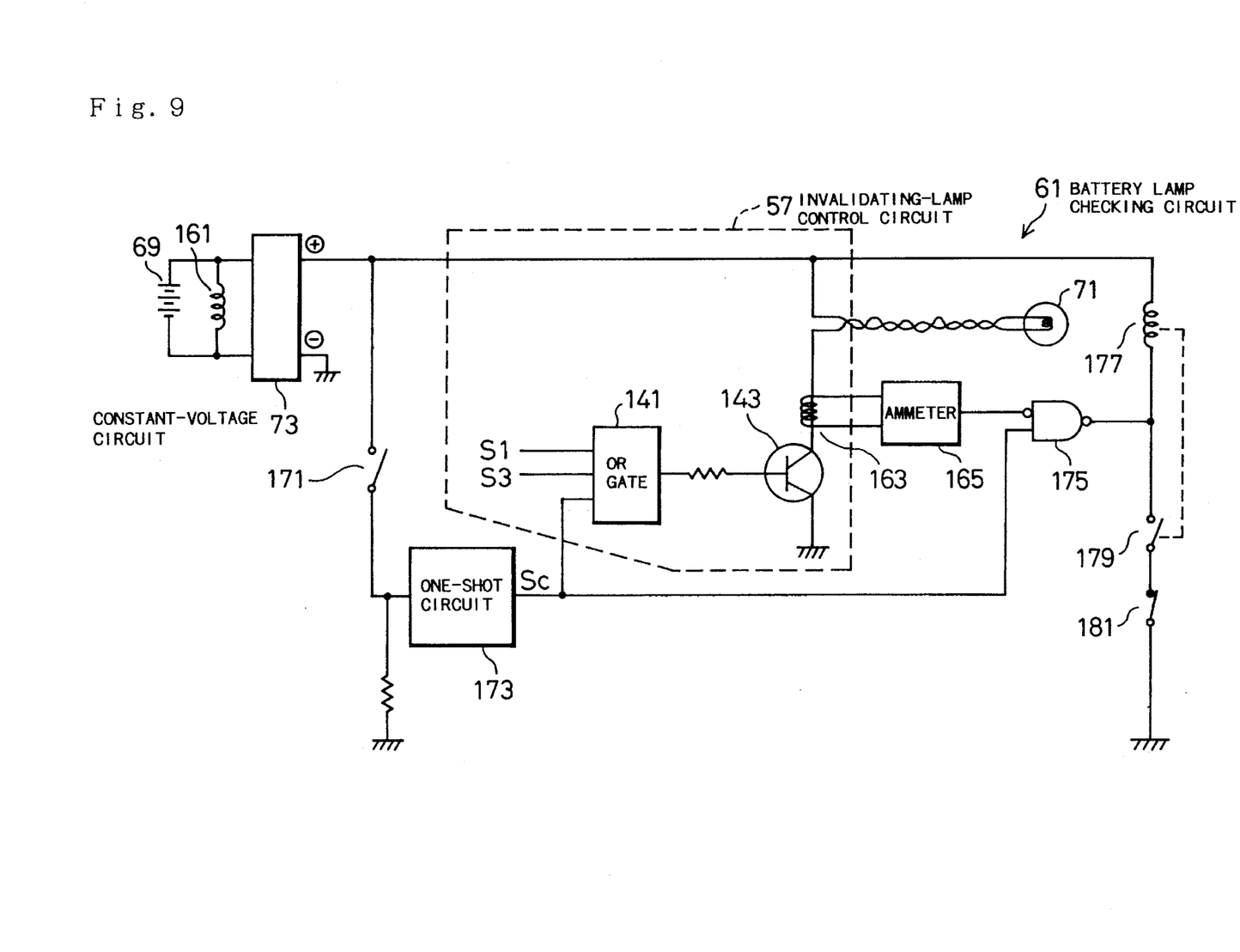
FIG. 9 is a circuit diagram showing a invalidating-lamp control circuit 57 and a battery lamp checking circuit 61 forming part of the color scanner of FIG. 1.

FIG. 9 is a circuit diagram showing the invalidating-lamp control circuit 57 and the battery lamp checking circuit 61. As illustrated in FIG. 9, the invalidating-lamp control circuit 57 includes an OR gate 141 and a switching transistor 143. The switching transistor 143 and the invalidating lamp 71 are connected in series relative to a constant-voltage circuit 73. The OR gate 141 receives the identification signal S1 output from the determination circuit 55 and the abnormal operation signal S3 output from the abnormal operation detecting circuit 59. When at least one of the signals S1 and S3 (and another signal Sc output from a one-shot circuit 173 described below) is in an ON condition, the OR gate 141 outputs an ON signal. The switching transistor 143 receives the ON signal and opens to turn the invalidating lamp 71 on.

The invalidating-lamp control circuit 57 turns the invalidating lamp 71 on when the identification signal S1 from the determination circuit 55 is in an ON condition, that is, when the original OF is determined to be a bank note, or when the abnormal operation signal S3 from the abnormal operation detecting circuit 59 is in an ON condition, that is, when an abnormal operation is executed while the bank-note recognition rate is greater than the predetermined reference value.

The circuit diagram of FIG. 9 shows the battery lamp checking circuit 61 other than the invalidating-lamp control circuit 57, the battery 69, the constant-voltage circuit 73, and the invalidating lamp 71. In the battery lamp checking circuit 61, a first solenoid 161 connected in parallel to the battery 69 detects disconnection or a decrease in the electricity storage amount of the battery 69 whereas a coil 163 wound upon a wire between the invalidating lamp 71 and the switching transistor 143 detects disconnection of the invalidating lamp 71.

The one-shot circuit 173 connects to a switch 171 of a blower which is driven for applying the recording film RF securely onto the output drum 17. An output terminal of the one-shot circuit 173 connects to a third input terminal of the OR gate 141. The electric current running through the coil 163 is detected by an ammeter 165. Both an output terminal of the ammeter 165 and the output terminal of the one-shot circuit 173 are connected with an input terminal of a logic circuit 175. An output terminal of the logic circuit 175 is generally under ON conditions and connects to a second solenoid 177, which is further connected with a positive terminal of the constant-voltage circuit 73, as well as a self-hold switch 179 and a key switch 181, which are further connected with a negative terminal of the constant-voltage circuit 73.

The one-shot circuit 173 generates a lamp check signal Sc, which rises to an ON condition in response to a rise of the switch 171 to an ON condition and is kept ON for a predetermined time period (for example, 100 msec). Output of the lamp check signal Sc makes the output of the OR gate 141 ON and opens the switching transistor 143 to turn the invalidating lamp 71 on. Any trouble of the invalidating lamp 71 such as disconnection thereof causes the output signal from the ammeter 165 to be kept OFF. The output signal from the logic circuit 175 falls to an OFF condition in response to the OFF signal from the ammeter 165 and the ON signal Sc from the one-shot circuit 173.

When the output terminal of the logic circuit 175 is turned OFF, the electric current from the positive terminal of the constant-voltage circuit 73 runs into the logic circuit 175 via the second solenoid 177. This makes the second solenoid 177 rise to an ON condition. The rise of the second solenoid 177 allows the self-hold switch 179 coupled with a relay (described later) of the second solenoid 177 to rise to an ON condition. The self-hold switch 179 keeps its ON condition even when the output signal Sc from the one-shot circuit 173 is turned OFF in response to a fall of the pulse.

As a result, the electric current from the positive terminal of the constant-voltage circuit 73 runs through the second solenoid 177, the self-hold switch 179, and the key switch 181 into the ground. After the output signal of the logic circuit 175 falls to OFF, the second solenoid 177 continuously keeps its ON condition.

The key switch 181 is used to reset the conditions of the second solenoid 177. When the disconnected invalidating lamp 71 is replaced with a new one, the key switch 181 is manually switched OFF. The operation of the key switch 181 to an OFF condition cuts off the electric current running through the second solenoid 177. The self-hold switch 179 then falls to OFF and keeps its OFF condition.

In the case of voltage drop of the battery 69, the electric current running through the first solenoid 161 is cut off. The first solenoid 161 and the second solenoid 177 controls on and off relays disposed in the actuation canceling circuit 63 and the alarm circuit 65.

Figure 10:
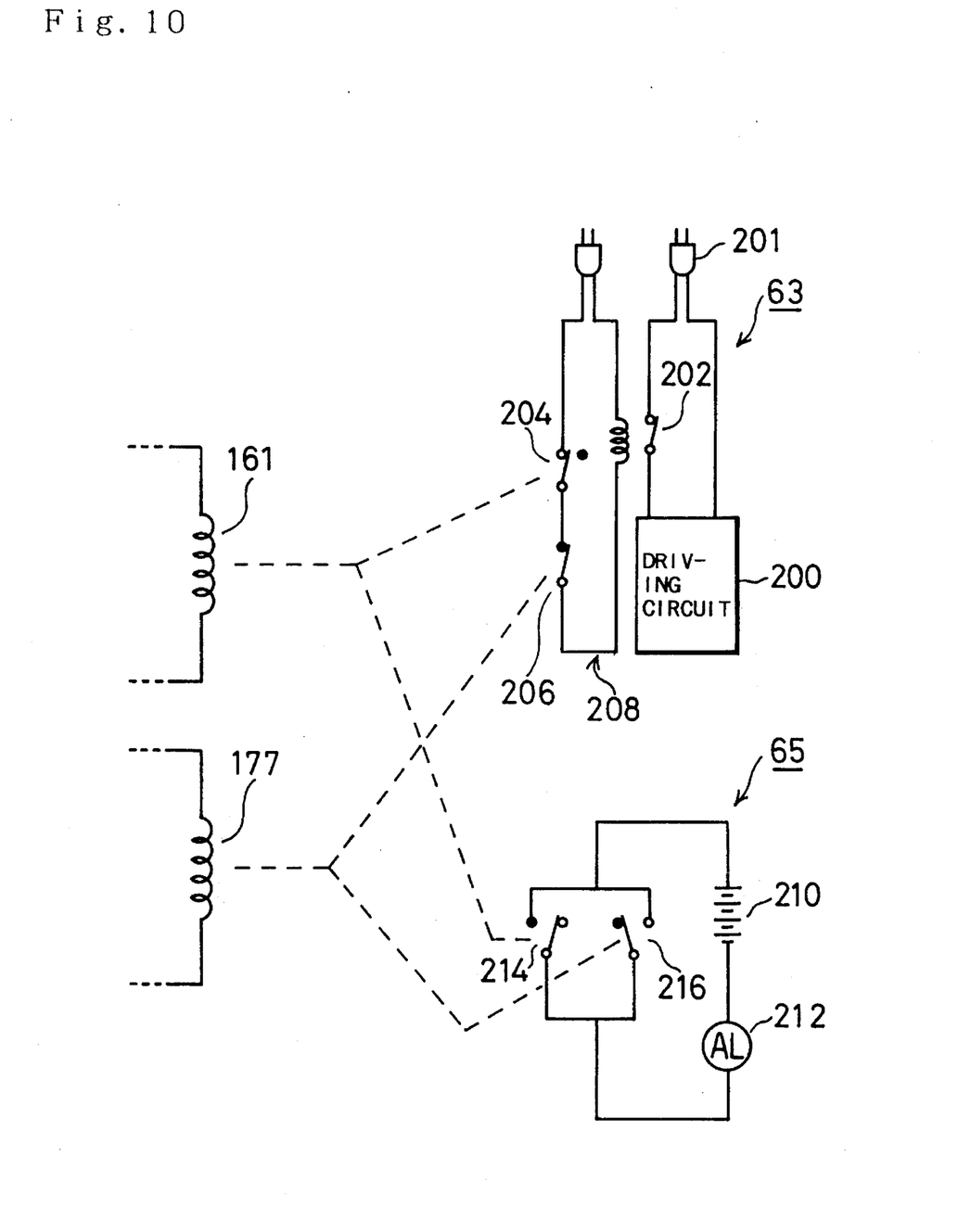
FIG. 10 is a circuit diagram showing an actuation canceling circuit 63 and an alarm circuit 65 in connection with a first solenoid 161 and a second solenoid 177 forming part of the color scanner of FIG. 1.

FIG. 10 is a circuit diagram showing the actuation canceling circuit 63 and the alarm circuit 65 in connection with the first solenoid 161 and the second solenoid 177. As illustrated in FIG. 10, the actuation canceling circuit 63 includes a first relay 202 between an AC power plug 201 and a driving circuit 200 of the scanner unit 10. The first relay 202 is controlled on and off via a closed circuit 208 including a second relay 204 and a third relay 206.

The second relay 204 is coupled with the first solenoid 161. Voltage drop of the battery 69 cuts off the electric current running through the first solenoid 161 and accordingly switches the second relay 204 to an OFF condition. This makes the first relay 202 fall to an OFF condition and interferes with operation of the driving circuit 200. The third relay 206 is coupled with the second solenoid 177. Disconnection of the invalidating lamp 71 allows electricity to pass through the second solenoid 177 and accordingly switches the third relay 206 to an OFF condition. This makes the first relay 202 fall to an OFF condition and interferes with operation of the driving circuit 200.

The alarm circuit 65 includes a second battery 210, a warning circuit 212, a fourth relay 214, and a fifth relay 216. The fourth relay 214 and the fifth relay 216 are connected in parallel to each other in the alarm circuit 65.

The fourth relay 214 is coupled with the first solenoid 161. Voltage drop of the battery 69 cuts off the electric current running through the first solenoid 161. The fourth relay 214 is accordingly switched to ON conditions and the warning circuit 212 is driven to generate an alarm sound. The fifth relay 216 is coupled with the second solenoid 177. Disconnection of the invalidating lamp 71 allows electricity to pass through the second solenoid 177. The fifth relay 216 is accordingly switched to an ON condition and the warning circuit 212 is driven to generate an alarm sound.

The color scanner 1 of the first embodiment thus constructed turns on the invalidating lamp 71 in response to recognition of the original OF as a bank note in the course of scanning, so as to expose the whole surface of the recording film RF wound upon the output drum 17 to an exposure light. When the original OF is recognized as a bank note, the whole recording surface on the recording film RF including the recorded portion is exposed to the exposure light. This effectively prevents patching of plural recorded portions to give a complete bank note.

The color scanner 1 is structured to turn on the invalidating lamp 71 in response to an abnormal operation such as an intentional stop of scanning during recording of a color image. The forcible stop of scanning accordingly results in blackening and damaging the whole recorded portion. This effectively prevents partial color separation images from being recorded separately and joined together to give a complete bank note. The invalidating lamp 71 is turned on in response to the abnormal operation only when the bank-note recognition rate exceeds a predetermined reference value. When the bank-note recognition rate is sufficiently low and there is no fear of patchwork forgery, the invalidating lamp 71 is not turned on unnecessarily.

In response to disconnection of the invalidating lamp 71 or voltage drop of the battery 69 for supplying power to the invalidating lamp 71, the color scanner 1 interferes with operation of the driving circuit 200 for actuating the scanner unit 10 and activates the warning circuit 212 to generate an alarm sound. The color scanner 1 can thus effectively prevent forgery of bank notes under forcible inactivated conditions of the invalidating lamp 71.

Figure 11:
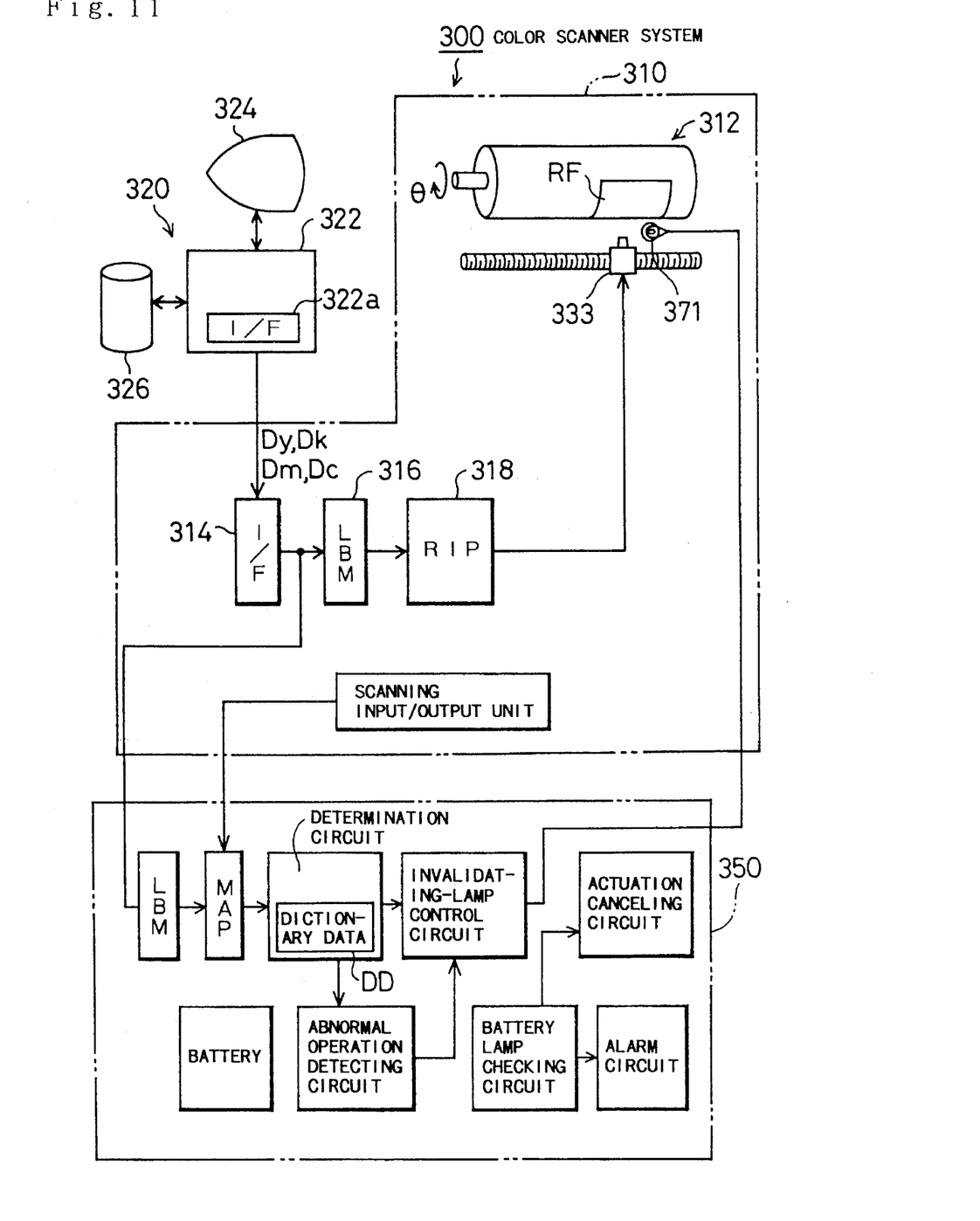
FIG. 11 is a block diagram schematically illustrating a color scanner system 300 as a second embodiment of the invention.

FIG. 11 is a block diagram schematically illustrating a color scanner system 300 as a second embodiment of the invention. As shown in FIG. 11, the color scanner system 300 has several differences from the color scanner 1 of the first embodiment. A scanner unit 310 of the color scanner system 300 has no input scanner but only an output scanner 312. The scanner unit 310 receives image signals transmitted from an outside work station 320 and records color separation images based on the image signals. The color scanner system 300 is otherwise constructed similar to the color scanner 1 of the first embodiment and includes a bank-note identification unit 350, which receives images signals output from the work station 320 via an interface 314 and controls on and off a invalidating lamp 371 in response to the image signals.

The work station 320 is provided with a work station main unit 322 and peripheral units including a color monitor 324 and a hard disk drive 326. The hard disk drive 326 stores image data Dy, Dk, Dm, and Dc corresponding to color separation images of Y, K, M, and C separations. The image data Dy, Dk, Dm, and Dc taken out of the hard disk drive 326 are received by the work station main unit 322 and output to the interface 314 of the scanner unit 310 via another interface 322a.

In the scanner unit 310, after the image data Dy, Dk, Dm, and Dc are once stored in a line buffer memory 316, a raster image processor (RIP) 318 generates halftone dot signals for recording. The halftone dot signals are sent to a record head 333, which records halftone dot images based on the image data Dy, Dk, Dm, and Dc sent from the work station 320 onto a recording film RF. The scanner unit 310 also transmits the image data Dy, Dk, Dm, and Dc to the bank-note identification unit 350. The bank-note identification unit 350 having a structure similar to that of the first embodiment determines whether the image data Dy, Dk, Dm, and Dc represent a bank note, and turns the invalidating lamp 371 on to expose the whole surface of the recording film RF to an exposure light when the determination result is affirmative.

Like the color scanner 1 of the first embodiment, the color scanner system 300 of the second embodiment exposes the whole surface of the recording film RF to the exposure light, thus securely preventing forgery of bank notes based on image data previously separated in color and stored in the hard disk drive 326 or image data generated in the work station 320. Even in the case of a forcible stop of scanning or an intentional disconnection of the invalidating lamp 371, the color scanner system 300 can securely prevent forgery of bank notes as the first embodiment.

In the color scanners of the first and the second embodiments, the recording film RF is attached to and detached from the output drum according to manual operations. The present invention is also applicable to another color scanner system in which the recording film RF is attached to and detached from the output drum according to fully automatic operations.

Figure 12:
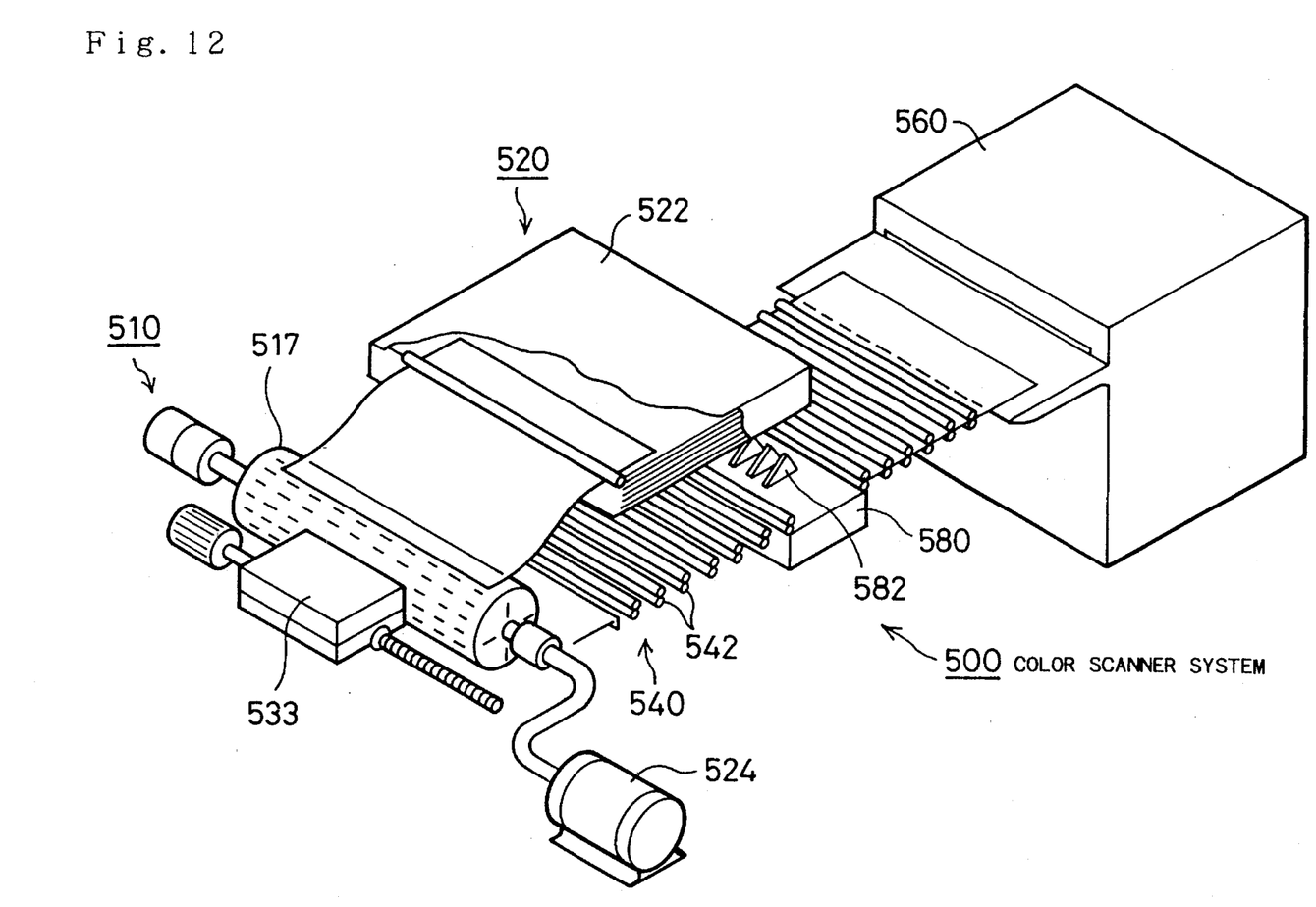
FIG. 12 is a perspective view illustrating an output structure of a color scanner system 500 as a third embodiment of the invention.

FIG. 12 is a perspective view illustrating an output structure of a color scanner system 500 as a third embodiment of the invention. The output structure of the color scanner system 500 includes an output scanner 510, a film supply unit 520, a film feeder unit 540, and a film development unit 560.

The film supply unit 520 is provided with a film cassette 522 for accommodating a recording film RF therein. The recording film RF accommodated in the film cassette 522 is fed to an output drum 517 of the output scanner 510 and tightly applied onto the output drum 517 by actuation of a blower motor 524. A record film 533 then exposes the recording film RF attached onto the output drum 517 to a light beam. The exposed recording film RF is transported to the film development unit 560 via feed rollers 542 of the film feeder unit 540 for development of color separation images.

The color scanner system 500 further includes a film cutter unit 580 in the vicinity of the feed rollers 542. The film cutter unit 580 functions as the record invalidating means, in place of the invalidating lamp 71 of the first and the second embodiments. When the original OF is determined to be a bank note, the film cutter unit 580 is driven to project a plurality of cutting edges 582 upward from a feeding path of the recording film RF so as to shred the recording film RF fed along the feeding path.

In the color scanner system 500 of the third embodiment thus constructed, when the original OF is recognized as a bank note in the course of scanning, the recording film RF is shredded after exposure of the recording film RF with the output scanner 510. The color scanner system of the third embodiment can thus effectively prevent forgery of bank notes like the first and the second embodiments.

In such full-automatic system wherein the process from attachment and detachment of the recording film RF to development of the exposed film is fully automated, the record invalidating means, realized as the film cutter unit 580 in the third embodiment, may have an alternative structure of feeding out the exposed film before the film development unit to invalidate the exposed film. This alternative structure can also prevent forgery of bank notes like the above embodiments. In still another structure, the record invalidating means may be realized by a structure of scanning the record head 533 in a reverse direction under conditions of full-power exposure. The structure of the first or the second embodiment may also be applicable for the record invalidating means of the third embodiment.

The invention may further be applied to image recording apparatus of flat-bed scanning other than those of drum scanning explained in the first and the third embodiments. The image recording apparatus of the invention can also be used to prevent forgery of securities, postage stamps, revenue stamps, and the like.

Since there may be many other modifications, changes, and alterations without departing from the scope or spirit of essential characteristics of the invention, it is clearly understood that the above embodiments are only illustrative and not restrictive in any sense. The spirit and scope of the present invention is limited only by the terms of the appended claims.

What is claimed is:

1. An image recording apparatus for recording a color image, said apparatus comprising:

input means for successively receiving a plurality of image signals representing a plurality of color separation image corresponding to an original color image;

image recording means for recording said plurality of color separation images onto a recording medium based on said plurality of image signals received by said input means to form a record;

determination means for comparing said plurality of image signals received by said input means with specific image data representing a predetermined specific image and determining whether said original color image conforms with said specific image, said determination means including conformity degree calculation means for calculating a degree of conformity of said original color image with said specific image based on a comparison of said image signals with said specific image data and conformity determination means for determining whether said original color image conforms with said specific image according to a comparison of the degree of conformity with a predetermined first threshold value;

record invalidating means for invalidating the record on said recording medium formed by said image recording means when said determination means determines that said original color image conforms with said specific image;

abnormal operation detecting means for detecting an abnormal operation of intentionally stopping said image recording means during recording; and forcible invalidating means for activating said record invalidating means when said abnormal operation is detected.

2. An image recording apparatus in accordance with claim 1, wherein said determination means further comprises:

forcible-invalidating process cancellation means for interfering with execution of said forcible invalidating means when the degree of conformity is not greater than a predetermined second threshold value.

3. An image recording apparatus for recording a color image, said apparatus comprising:

input means for successively receiving a plurality of image signals representing a plurality of color separation images corresponding to an original color image;

image recording means for recording said plurality of color separation images onto a recording medium based on said plurality of image signals received by said input means to form a record;

determination means for comparing said plurality of image signals received by said input means with specific image data representing a predetermined specific image and determining whether said original color image conforms with said specific image, said determination means including conformity degree calculation means for calculating a degree of conformity of said original color image with said specific image based on a comparison of said image signals with said specific image data and conformity determination means for determining whether said original color image conforms with said specific image according to a comparison of the degree of conformity with a predetermined first threshold value;

record invalidating means for invalidating the record on said recording medium formed by said image recording means when said determination means determines that said original color image conforms with said specific image;

interference detecting means for detecting, an attempt to interfere with execution of said record invalidating means; and driving prohibition means for prohibiting actuation of said image recording means when said attempt to interfere is detected.

4. An image recording apparatus in accordance with claim 3, wherein said interference detecting means comprises voltage drop detecting means for detecting a decrease in a voltage supplied to said image recording apparatus.

5. An image recording apparatus in accordance with claim 3, wherein said record invalidating means comprises an invalidating lamp which exposes a whole surface of said recording medium to a light beam in the course of said recording; and said interference detecting means comprises lamp disconnection detecting means for detecting a disconnection of said invalidating lamp from said record invalidating means.

6. An image recording apparatus for recording a color image, said apparatus comprising:

input means for successively receiving a plurality of image signals representing a plurality of color separation images corresponding to an original color image;

image recording means for recording said plurality of color separation images onto a recording medium based on said plurality of image signals received by said input means to form a record;

determination means for comparing said plurality of image signals received by said input means with specific image data representing a predetermined specific image and determining whether said original color image conforms with said specific image said determination means including conformity degree calculation means for calculating a degree of conformity of said original color image with said specific image based on a comparison of said image signals with said specific image data and conformity determination means for determining whether said original color image conforms with said specific image according to a comparison of the degree of conformity with a predetermined first threshold value;

record invalidating means for invalidating the record on said recording medium formed by said image recording means when said determination means determines that said original color image conforms with said specific image;

interference detecting means for detecting an attempt to interfere with execution of said record invalidating means; and alarm means for generating an alarm when said attempt to interfere is detected.

7. A method of recording a color image with an image recording apparatus, said method comprising the steps of:

(a) successively receiving a plurality of image signals representing a plurality of color separation images corresponding to an original color image;

(b) recording said plurality of color separation images onto a recording medium based on said plurality of image signals received in said step (a) to form a record;

(c) comparing said plurality of image signals received in said step (a) with specific image data representing a predetermined specific image and determining whether said original color image conforms with said specific image, step (c) including the steps of (c-1) calculating a degree of conformity of said original color image with said specific image based on a comparison of said image signals with said specific image data and (c-2) determining whether said original color image conforms with said specific image according to a comparison of the degree of conformity with a predetermined first threshold value;

(d) when said original color image is determined to conform with said specific image in step (c), invalidating the record on said recording medium formed by said step (b);

(e) detecting an abnormal operation of intentionally stopping the process of step (b); and (f) when said abnormal operation is detected, invalidating the record on said recording medium formed by step (b).

8. A method in accordance with claim 7, wherein step (c) further comprises the step of:

(c-3) interfering with execution of step (f) when the degree of conformity is not greater than a predetermined second threshold value.

9. A method of recording a color image with an image recording apparatus, said method comprising the steps of:

(a) successively receiving a plurality of image signals representing a plurality of color separation images corresponding to an original color image;

(b) recording said plurality of color separation images onto a recording medium based on said plurality of image signals received in said step (a) to form a record;

(c) comparing said plurality of image signals received in said step (a) with specific image and determining whether said original color image conforms with said specific image step (c) including the steps of (c-1) calculating a degree of conformity of said original color image with said specific image based on a comparison of said image signals with said specific image data and (c-2) determining whether said original color image conforms with said specific image according to a comparison of the degree of conformity with a predetermined first threshold value;

(d) when said original color image is determined to conform with said specific image in step (c), invalidating the record on said recording medium formed by said step (b);

(e) detecting an attempt to interfere with execution of step (d); and (f) when said attempt to interfere is detected, prohibiting execution of step (b).

10. A method in accordance with claim 9, wherein step (g) further comprises the step of:

(g-1) detecting a decrease in a voltage supplied to said image recording apparatus.

11. A method in accordance with claim 9, wherein step (d) comprises the step of:

(d-1) exposing a whole surface of said recording medium to a light beam of an invalidating lamp in the course of said recording; and step (g) comprises the step of:

(g-2) detecting a disconnection of said invalidating lamp from said image recording apparatus.

12. A method of recording a color image with an image recording apparatus, said method comprising the steps of:

(a) successively receiving a plurality of image signals representing a plurality of color separation images corresponding to an original color image:

(b) recording said plurality of color separation images onto a recording medium based on said plurality of image signals received in said step (a) to form a record;

(c) comparing said plurality of image signals received in said step (a) with specific image data representing a predetermined specific image and determining whether said original color image conforms with said specific image, step (c) including the steps of (c-1) calculating a degree of conformity of said original color image with said specific image based on a comparison of said image signals with said specific image data and (c-2) determining whether said original color image conforms with said specific image according to a comparison of the degree of conformity with a predetermined first threshold value;

(d) when said original color image is determined to conform with said specific image in step (c), invalidating the record on said recording medium formed by said step (b);

(i) detecting an attempt to interfere with execution of step (d); and (j) when said attempt to interfere is detected, generating an alarm.

* * * * *